March 26, 1968
R. R. HANSON
3,374,549
ORIENTATOR
Filed May 9, 1966
5 Sheets-Sheet 1
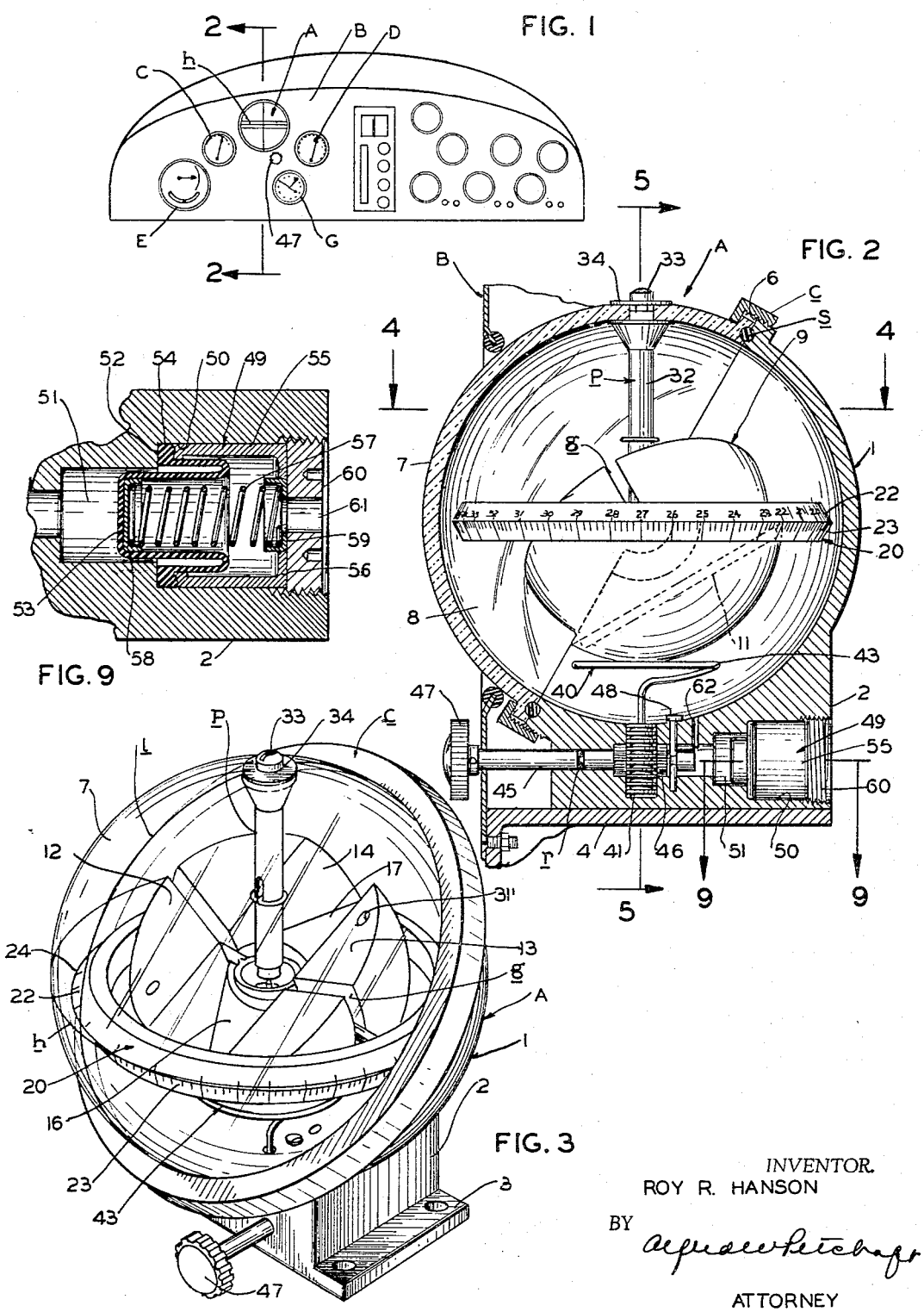
INVENTOR.
ROY R. HANSON
BY
ATTORNEY

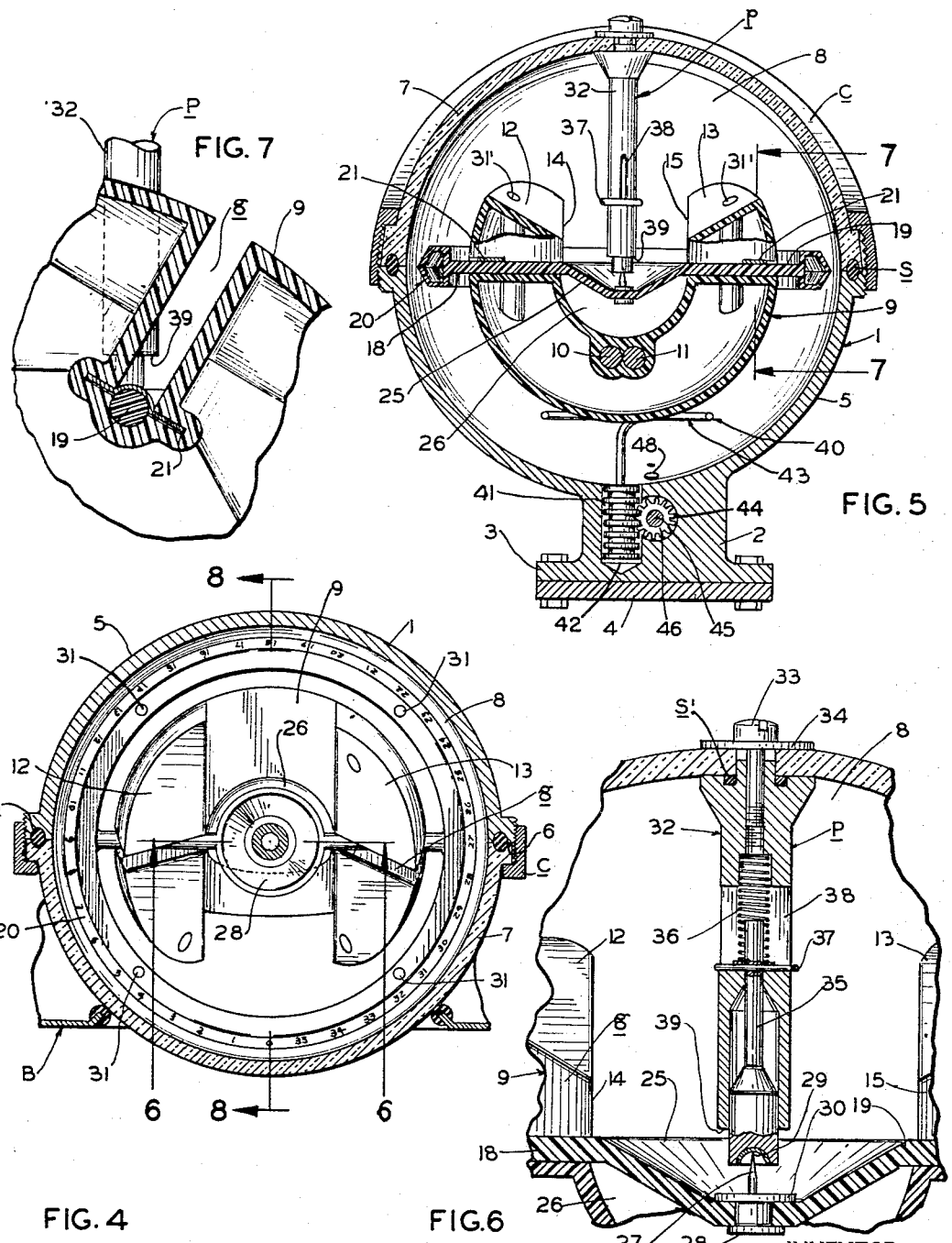

March 26, 1968 R. R. HANSON 3,374,549
ORIENTATOR

Filed May 9, 1966 5 Sheets-Sheet 3

INVENTOR.
ROY R. HANSON
BY
ATTORNEY

March 26, 1968  R. R. HANSON  3,374,549
ORIENTATOR

Filed May 9, 1966  5 Sheets-Sheet 4

INVENTOR.
ROY R. HANSON
BY *Dominik, Stein & Knechtel*
ATTYS.

United States Patent Office 3,374,549
Patented Mar. 26, 1968

3,374,549
ORIENTATOR
Roy R. Hansen, Maryland Heights, Mo., assignor of one-fourth each to William H. Anderson, Glencoe, the estate of Joseph H. Schierman, late of St. Louis, and George A. Blase, St. Louis, Mo.
Continuation-in-part of application Ser. No. 182,239, Mar. 26, 1962. This application May 9, 1966, Ser. No. 559,666
5 Claims. (Cl. 33—223)

This application is a continuation-in-part of application Ser. No. 182,239, filed Mar. 26, 1962, now abandoned.

This invention relates in general to certain new and useful improvements in orientation devices for aircraft and, more particularly, to a magnetically operated orientator for indicating direction and attitude of such vehicles.

With the rapid increase in use of personal aircraft by business executives, sportsmen, and aircraft enthusiasts, the problems of navigation under adverse weather conditions has become a matter of major concern. Professional pilots employed by established airlines, of course, have the benefit of radio range equipment, autopilots, and costly instrumentation. In view of the size of commercial aircraft and the mandatory requirements for maximal safety, neither cost nor weight are factors in the selection and installation of such equipment. In addition, all commercial airlines employ pilots, navigators, and flight engineers so that the complicated multiplicity of tasks involved in following a multiplicity of navigational and other instruments during flight can be performed with safety and precision. In the case of smaller aircraft, such as personal planes, company planes, and the like, however, the problems of blind flight instrumentation have become quite serious.

In order to aid the non-professional pilot in maintaining a small plane in proper attitude, the control panel is provided with an array of instruments for determining the altitude and speed of the aircraft in addition to the yaw, the angle of bank, or the pitching movement of such aircraft. In large commercial aircraft, the instrument panel is provided with a set of duplicate instruments in case any of the first set of instruments should fail to function or became inoperative. The above-mentioned instruments are fairly accurate as long as the aircraft is maintained under a constant attitude. It is, of course, obvious that the instruments such as the altimeter and the air speed indicator must be corrected for such external factors as the air pressure and the air temperature. Obviously, such instruments only give relative readings and, therefore, are not particularly accurate.

Most modern aircraft are provided with a heading gyro, a turn and bank indicator, and an attitude gyro which aid the pilot in determining the angle of pitch, yaw, and the angle of bank. The principal difficulty involved with all of these instruments is the fact that they are three, rather than one. Necessarily, then, the pilot must scan all three instruments in order to be able to determine the exact attitude of his aircraft, and take whatever corrective measures are required. Furthermore, as will be set forth in greater detail hereafter, the compass has an undue amount of lag and lead depending upon its turn, and the directional gyro precesses. Thus the pilot must wait until the compass "settles down" after any maneuvering, and then reset his directional gyro from time to time to coordinate the same with the magnetic readings.

The compasses presently used in large aircraft suffer from deficiencies previously described. When the aircraft is banked for a turn or if the yaw or pitch should suddenly change, the compass becomes virtually ineffective. The compass normally remains accurate only when the attitude of the aircraft remains unchanged. For example, if the aircraft should make a turn while heading in a northerly direction, the compass will indicate a directional turn opposite to the direction of actual turn. If the aircraft should make a turn while heading in a southerly direction, the compass will indicate a turn in the proper direction, but at an excessive degree.

It is, therefore, the primary object of the present invention to provide a magnetically controlled orientator which will effectively and accurately indicate the angle of bank, the angle of pitch, and the magnetic heading of an aircraft in a single instrument, thereby eliminating the need of a plurality of power driven instruments to perform the same function.

It is another object of the present invention to provide an orientator of the type stated which will accurately indicate the angles of bank and pitch of an aircraft during the change of attitude of such aircraft.

It is a further object of the present invention to provide an orientator of the type stated which will directly indicate the attitude without a lag in indication or the need of compensation for precision.

It is also an object of the present invention to provide an orientator of the type stated which is capable of providing accurate indications of aircraft attitude without visual reference to external conditions.

It is an additional object of the present invention to provide an orientator of the type stated which is rigid and sturdy in construction, yet light in weight, accurate in operation, and economical in cost of manufacture.

Still a further object of an improved embodiment of the present invention is to provide a reading of pitch and bank with a natural presentation showing the relative movement of the aircraft with regard to the earth's surface in its natural form.

With the above and other objects in view, my invention resides in the novel features of form, construction, arrangement, and combination of parts presently described and pointed out in the claims.

In the accompanying drawings:

FIG. 1 is a front elevational view of an orientator constructed in accordance with and embodying the present invention and mounted in an aircraft control panel;

FIG. 2 is a vertical sectional view of the orientator taken along line 2—2 of FIG. 1;

FIG. 3 is a perspective view of the orientator constructed in accodance with and embodying the present invention;

Figure 8:
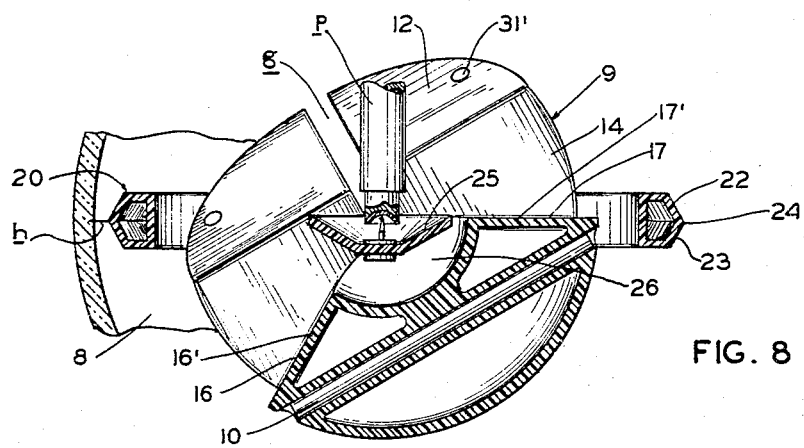
Figure 10:
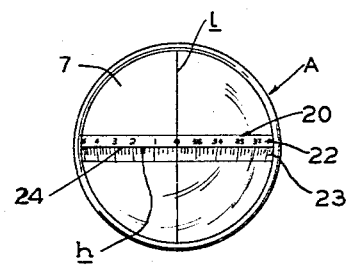
Figure 11:
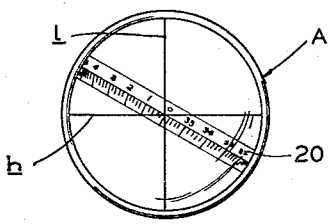
Figure 12:
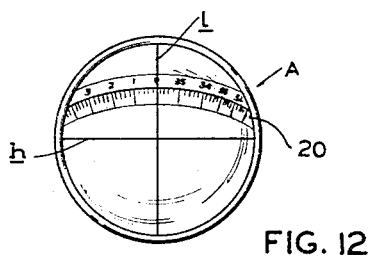
Figure 13:
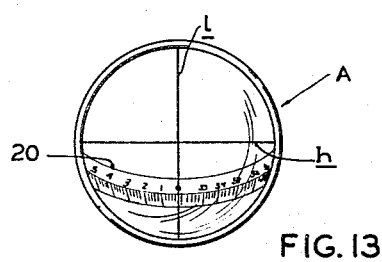
Figure 14:
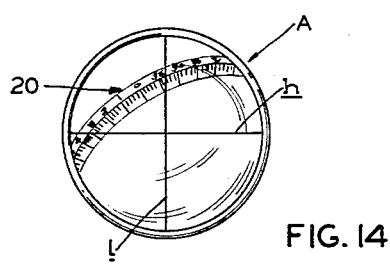
Figure 15:
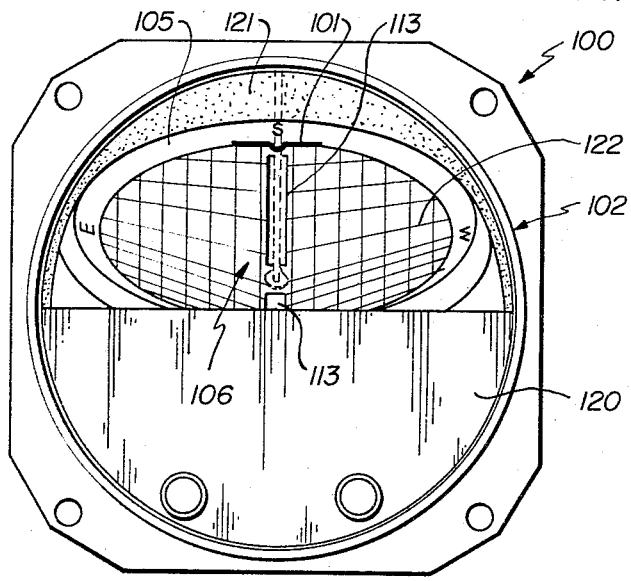
Figure 16:
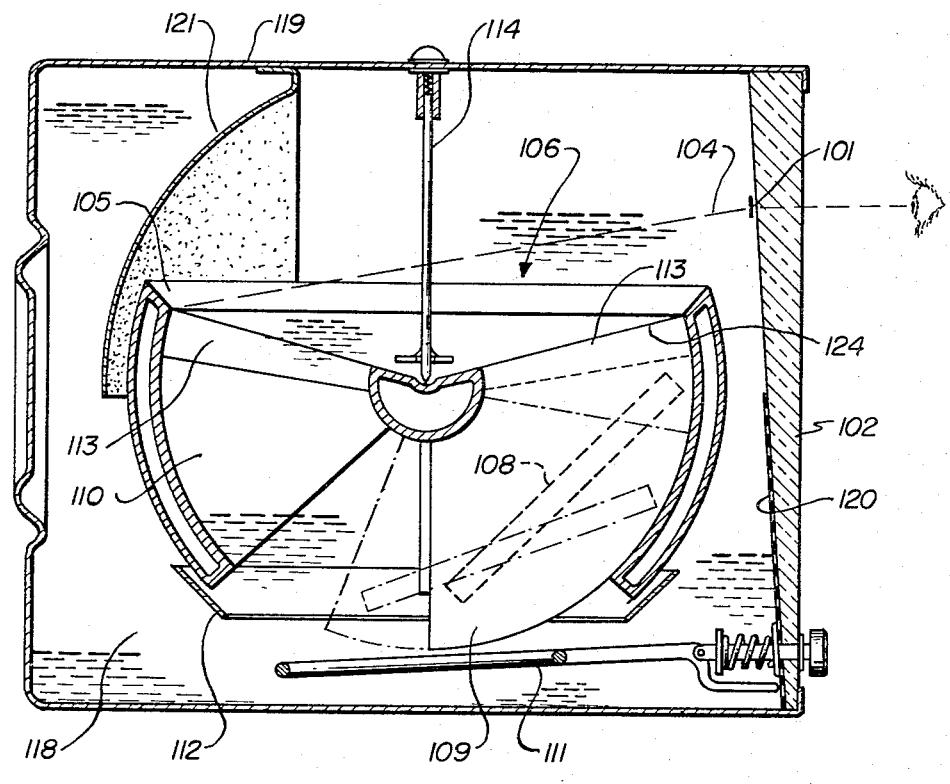
Figure 17:
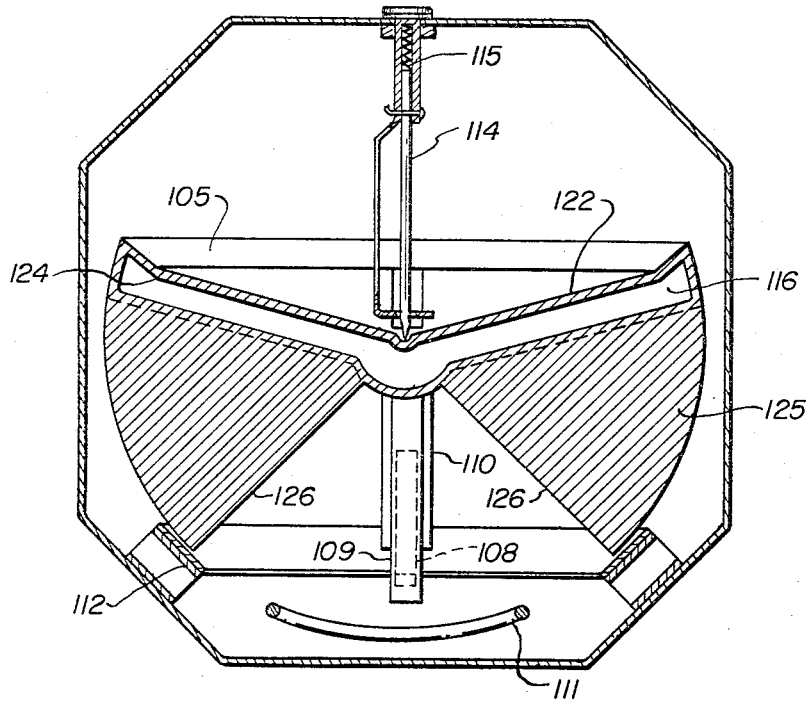
Figure 18:
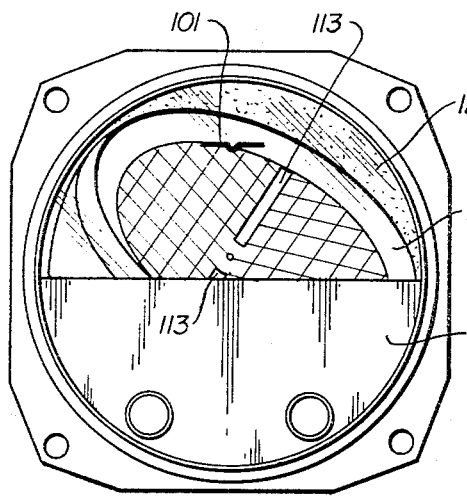
Figure 19:
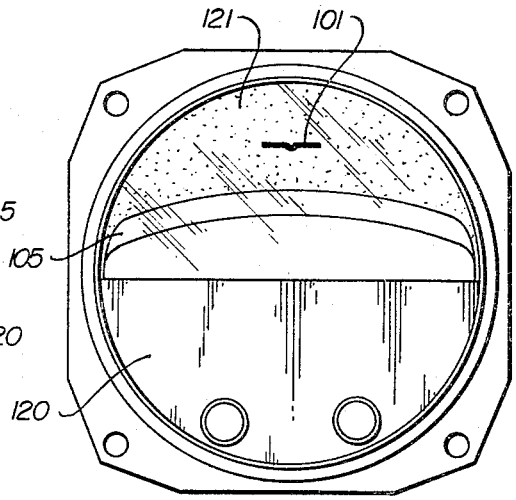

FIGS. 4 and 5 are sectional views taken along lines 4—4 and 5—5, respectively, of FIG. 3;

FIG. 6 is a fragmentary sectional view taken along line 6—6 of FIG. 4;

FIG. 7 is a fragmentary sectional view taken along line 7—7 of FIG. 3;

FIG. 8 is a fragmentary sectional view taken along line 8—8 of FIG. 4;

FIG. 9 is a fragmentary sectional view taken along line 9—9 of FIG. 2;

FIG. 10 is a front elevational view of the orientator showing the position of the horizon bar forming a part thereof, when the aircraft is flying in a horizontal position;

FIG. 11 is a front elevational view of the orientator showing the position of the horizon bar forming a part thereof, when the aircraft is flying in a thirty degree left bank;

FIG. 12 is a front elevational view of the orientator showing the position of the horizon bar forming a part thereof when the aircraft is flying in a thirty degree climb;

FIG. 13 is a front elevational view of the orientator showing the position of the horizon bar forming a part thereof when the aircraft is flying in a 30° dive;

FIG. 14 is a front elevational view of the orientator showing the position of the horizon bar forming a part thereof when the aircraft is flying in a 30° climb and a 30° right bank;

FIG. 15 is a front elevation of an alternative improved embodiment of the invention;

FIG. 16 is a longitudinal sectional view of the instrument as shown in FIG. 15 taken from the left hand side thereof;

FIG. 17 is a transverse sectional view of the instrument as shown in FIG. 15 taken at a midportion along its longitudinal axis;

FIG. 18 is a pictorial view indicating the presentation to the pilot while executing a banking turn to the left at a level attitude; and FIG. 19 is a pictorial view illustrating the position of the floating element as seen by the pilot while the host aircraft is climbing in a straight and level condition.

The present invention employs a bar magnet mounted within a floating member, beneath the pivot point of the floating member within an orienting instrument. The universally pivoted assembly is made such that when complete with the magnets installed, it is slightly pendulous so as to provide a horizontal stabilizing factor.

In order to implement the above principle into a useful operative structure, a floating member is pivotally mounted within a housing, the floating member and the fluid suspending the same being selected so that the amount of buoyancy of the float is very slight in the particular fluid employed. A vertical support member extends from the upward portion of the housing resiliently downward, and engages pivot means on the center portion of the floating member. The floating member may have a compound U shape, or may be generally hemispherical in nature, the latter construction being employed in the second embodiment of the invention as will be described hereinafter. Critical to the invention, however, is the positioning of the magnet beneath the pivot point of the floating member. In addition, it is important to provide means for adjusting the angularity of the magnet with respect to the vertical axis of the float in order that the magnet may at all times be adjusted to assume a coordinated horizon relationship when the aircraft is in normal straight and level flight. The control of the orientation of the floating element is a direct function of the magnetic orientation of the permanent magnet. By positioning suitable orienting indicia about the periphery of the float, or on a separate ring, the positions of bank, pitch, and magnetic heading can all be read simultaneously off the instrument in one eye fixation, and completely independent of any external power means.

Referring now in more detail and by reference characters to the drawings, which illustrate a preferred embodiment of the present invention, A designates an orientator suitably mounted in a conventional aircraft control panel B also having mounted therein a conventional air speed indicator C, a conventional altimeter D, a conventional bank and turn indicator F, and a conventional clock G having a sweep-second hand.

The orientator A generally comprises an outer housing 1 including a base member 2, which integrally merges into extending support flanges 3 for bolting into a bracket 4 within the aircraft control panel. Integrally formed with the base member 2 is a hemispherical casing 5 which is tilted upwardly (reference being made to FIG. 2) at an angle of approximately thirty degrees to the true vertical. Secured to the forward margin 6 of the casing 5 by means of an L-shaped clamping ring c is a transparent hemisphere 7 which, when secured to the casing 5, will form an almost perfect sphere therewith. The casing 5 and the hemisphere 7 are both annularly grooved for the accommodation of an annular sealing ring s. The disk 7 is provided with a guide line h and a guide line l which are respectively parallel and perpendicular to the surface of the earth when the plane is in normal level flight.

By reference to FIG. 3, it can be seen that the transparent hemisphere 7 and the casing 5 forms a hermetically sealed fluid-tight spherical chamber 8 and disposed therein is a hollow element 9 and preferably formed of Bakelite, aluminum or other lightweight non-magnetic material. Mounted within and extending through the element 9 is a pair of permanent bar magnets 10, 11, which are preferably formed of alnico-5 or other similar high permeable magnetic material and which will orient the element 9 in a north-south direction when the element 9 is freely suspended in a suitable liquid, such as light mineral oil or other material having low surface tension so as to minimize transmission of mechanical forces from the outer housing 1 and the element 9.

Referring again to FIG. 3, it can be seen that the element 9 assumes the general form of a sphere with its upper portion removed by two radial cuts forming two inclined radial surfaces 12, 13, defining planes which would intersect at the exact geometric center of the sphere. The sphere is grooved in a north-south diretcion, or direction parallel to the bar magnets 10, 11, forming a pair of internal vertically spaced opposed walls 14, 15, which integrally merge into flat inclined bottom walls 16, 17. The walls 16, 17, define inclined planes which would form an imaginary apex slightly below the centroid of the sphere. When the element 9 is cut away in this described manner, the uncut portion thereof causes an apparent bulge on the underside of element 9, as can be best seen in FIGS. 2, 5 and 8.

The sphere is further provided with a groove g in the east-west direction or perpendicular to the axis of the bar magnets 10, 11, for accommodating the radial arms 18, 19, of a circular horizon ring or indicator 20 and is retained within the grooves g by means of spring-clips 21. The horizon indicator or ring 20 is preferably formed of Bakelite or other lightweight non-magnetic dielectric material and has a hollow non-rectangular cross-sectional shape with a pair of outwardly converging walls 22, 23, integrally merging at a common apex 24 which serves as a horizon indicating line. Preferably imprinted upon each of the walls 22, 23, are the degrees of magnetic heading, substantially as shown in FIGS 3 and 4.

The radial arms 18, 19, integrally merge into a conically shaped hub 25 which is movable in a semi-spherical recess or cavity 26 formed within the bottom walls 16, 17, of the element 9. The hub 25 includes a pivot pin 27 which is mounted thereon by means of a nut 28, the upper end of the pin 27 defining a pivot point 29 which is located at the exact center of gravity of the element 9 and which would be located at the centroid of the element 9 if same were a perfect sphere. Mounted on the hub 25 and concentrically encircling the pin 27 is a flat circular zeroing plate 30.

By reference to FIGS. 4 and 5, it can be seen that the horizon indicator or ring 20 is hollow in order to aid the buoyancy of the element 9 and, furthermore, the horizon ring 20 is rotated in the north-south direction with respect to the element 9. It is, of course, obvious that the horizon ring 20 must be perfectly balanced and stable with respect to the element 9 and is, therefore, provided with a series of circumferentially spaced balance weights 31. Similarly, the element 9 is provided with a plurality of balance weights 31'. The balance weights 31 and 31' are adjusted by trial and error both as to mass and position in order to provide a center of gravity at the desired point, taking into account the specific gravity and buoyant effect of the liquid in the sphere.

The element 9 is held within the chamber 8 by means of a downwardly presented pivot pylon p consisting of an outer tubular casing 32 which is secured to the transparent hemisphere 7 by means of a screw 33 and washer 34 and which extends vertically into the chamber 8. The buoyance of the element 9 tends to force it upwardly and thus holds the pivot pin 27 upwardly within the downwardly opening socket x in the lower end of the pivot pylon p. Since the horizon indicator 20 is supported by the element 9 and is, to some extent, buoyant, it will be similarly supported and constrained.

In order to maintain a fluid-tight seal, the pylon support 32 is annularly grooved at the point of securement to thereby accommodate a seal s. A plunger element 35 is spring-biased downwardly by means of a compression spring 36. The lower end of the pivot pylon p defines a zeroing surface 39 which is designed to abut the zeroing plate 30 mounted on the hub 25 when the plunger element 35 is completely disposed within the bore of the casing 32. In this connection, it is to be noted that the plunger element 35 has an axial length substantially shorter than the axial length of the bore and can be completely disposed therein. In this connection it should also be noted that the spring 36 is sized to maintain sufficient pressure to the horizon indicator 20 and the element 9 carried therewith so that they are, in effect, in a buoyant condition within the chamber 8.

Thus, the element 9 is affected by the natural magnetic field of the earth because of the magnets 10, 11, and responds to changes of direction by continually aligning itself with the earth's magnetic field.

The horizon indicator or ring 20 can be adjusted to a zero or craft horizontal position by means of an element elevator 40 which generally comprises a rack gear 41 disposed and movable within a bore 42 formed within the base member 2. Connected to the upper end of the gear 41 is a circular seating ring 43 which is sized to rest against the underside of the element 9. Journaled in a bore 44 formed with the base member 2 is a rotatable shaft 45 and mounted thereon is a pinion gear 46 which is adapted for mashing engagement with the rack gear 41, and mounted on the other end of the shaft 45 is a suitable control knob 47. The shaft 45 is annularly grooved at its inner end and retained within the bore 44 by means of pin 48.

Since changes of pressure and temperature will vary the density of the fluid within the chamber 8, and, therefore, the fluid volume, the orientator A is provided with a fluid accumulator 49 which will take up and provide fluid to the chamber 8 as the volume of the fluid therein changes. The base member 2 is internally bored from its rearward end to provide an accumulator chamber 50 which merges into a diametrically reduced fluid chamber or cylinder 51 defining an annular shoulder 52. Disposed within the accumulator chamber 50 is a somewhat flexible piston-like element 53 preferably formed of neoprene rubber or other resilient material and having an enlarged annular flange 54 which is rigidly held against the shoulder 52 by means of a tubular sleeve 55 having an end wall 56. The sleeve 55 is internally bored to accommodate a compression spring 57 which is retained by two spaced opposed cap members 58, 59, one of which abuts the piston-like element forcing it forwardly within the fluid chamber 51, the other of which abuts the end wall 56. The sleeve 55 is maintained in a rigid position within the accumulator chamber 50 by means of a plug 60. The plug 60, the end wall 56, and the cap members 59 are axially bored to provide an air venting aperture 61. Communication between the fluid chamber 51 and the chamber 8 is constantly maintained through a fluid duct 62. Thus, if the volume of the fluid within the chamber 8 should suddenly increase, due to a fluctuation of the atmospheric conditions, the excess fluid would be stored in the fluid chamber 51 against the action of the compression spring 57, forcing the piston-like element 53 rearwardly in the chamber 50. If, however, the volume of fluid maintained within the chamber 8 should decrease, the action of the compression spring 57 will urge the piston-like element 53 forwardly within the fluid chamber 51 in order to force more fluid into the chamber 8. In order to prevent leakage of fluid around the shaft 45 and out of the base member 2, the shaft 45 is grooved to accommodate a sealing ring r.

In use, the orientator A may be conveniently installed in the control panel of any aircraft, thereby eliminating the need of the conventional compass and other instruments used to indicate the attitude of the plane. However, it may be desirable to install the orientator A in the control panel, in addition to the other instruments therein, substantially as shown in FIG. 1, in order to provide a means for checking and calibrating the other instruments used to determine the attitude of the plane.

It is well known that the earth is surrounded by a magnetic field and that all magnetic objects in this particular magnetic field of the earth are affected thereby. It is further known that, at the magnetic Equator, the lines of magnetic flux run parallel to the surface of the earth and, at each of the magnetic poles, the magnetic lines of flux have a large vertical component and are directed downwardly with respect to the surface of the earth. In the areas surrounding the earth's surface lintermediate the Equator and each of the magnetic poles, the lines of magnetic flux forming part of the earth's magnetic field enter the earth at a direction which is inclined to the surface of the earth and the lines of magnetic flux thereby form an acute angle with the surface of the earth. The bar magnets 10, 11, within the element 9 will align themselves with the magnetic field of the earth and thereby the South Pole end of each of these magnets will be directed toward the north magnetic pole of the earth and the North Pole end of the magnets will be directed toward the south magnetic pole of the earth. If the aircraft is flying in an area near the Equator of the earth, the element 9 will remain in an upright position, but if the aircraft is flying within the northern or southern hemisphere of the earth at a point somewhat distant from the Equator, the element 9 will be slightly inclined within the chamber 8 at an angle which corresponds to the angle at which the magnetic lines of flux enter the earth at that particular location. Therefore, if the aircraft is flying within the northern hemisphere and in a northern direction, the ring 20 provided it is appropriately reset with respect to element 9 will assume the position as shown in FIG. 10.

As long as the flight path of the aircraft is parallel to the surface of the earth, and along a path of constant magnetic dip the position of the element 9 and the horizon indicator 20 will remain the same. However, if the aircraft is flying in a north-south direction or in a direction in which the magnetic dip changes, the position of the element 9 will vary slightly, according to the magnetic orientation at that particular location on the earth. Therefore, if the aircraft is flying in a northerly direction, the element 9 would tend to tilt slightly forward, that is to assume the position shown in FIG. 3. As the horizon indicator 20 will pivot with the element 9, the horizon index line 24 will not always remain in alignment with the horizon guide line h. From time to time, however, it will be necessary to correct this deviation. The pilot merely brings or maintains the aircraft in straight and level flight during this resetting and turns the control knob 47, which will, in turn, raise the rack gear 41 through the pinion gear 46, until the circular ring 43 is seated beneath the element 9. Continued rotation of the control knob 47 will raise the element 9 and the pivot pin 27 will urge the plunger 35 upwardly within the bore of the casing 32, until the zeroing surface 39 comes into contact with the zeroing plate 30. As the element 9 is elevated to its uppermost position, continued rotation of the control knob 47 will cause the horizon indicator 20 to pivot within the clips 21 until the horizon index line 24 is aligned with the guide line h. The control knob 47 is then turned in the reverse direction to lower the rack gear 41 and seating ring 43 until the element 9 is again maintained in a suspended state. Therefore, as the aircraft passes through each of the magnetic latitudes, the pilot can always maintain the horizon indicator 20 in constant alignment with the guide line h.

It can be seen that the element 9 and the horizon indicator 20 will always maintain the same position with respect to the surface of the earth at any particular magnetic latitude. Therefore, if the aircraft should change its heading or attitude relative to the earth, the element 9 will always remain constant in its position relative to the earth. If the aircraft is flying in a truly magnetic north direction, the zero index on the horizon indicator 20 will remain in vertical alignment with the guide line l. However, should the aircraft turn to fly in a westerly direction, the element 9 and the horizon indicator 20, which remains constant with respect to the earth, will remain in a fixed position relative to the earth, and, in effect, the casing 5 and guide line l will turn with respect to the element 9 until the guide line l is in alignment with the 270 degree mark on the horizon indicator 20.

In practice, however, an aircraft in flight can only turn by banking. Therefore, if the aircraft should make a 30 degree left bank, the housing 1 of the orientator A would rotate 30 degrees to the left with respect to the horizon indicator 20 and thereupon assume the position as shown in FIG. 11. At this position, it is indicated to the pilot that, in return to normal attitude, he must bank his plane 30 degrees to the right.

If the pilot should change the angle of pitch of the aircraft to a 30 degree climb, the housing 1 will rotate with respect to the horizon indicator 20 and assume the position as shown in FIG. 12. It is, therefore, indicated to the pilot that in order to return to the normal attitude, he must dive 30 degrees until the horizon index line 24 is returned to alignment with the horizon guide line h. If the aircraft should dive at a 30 degree angle with respect to the earth, the horizon indicator 20 would assume the position as shown in FIG. 13, and if the aircraft should make a right bank at 30 degrees and climb at 90 degrees with respect to the earth, the horizon indicator 20 would assume a position as shown in FIG. 14. The pilot must then maneuver the plane until it again attains proper attitude which will be indicated when the horizon indicator 20 assumes the position as shown in FIG. 10.

It can be seen that the pitch, the bank, and the magnetic heading of an aircraft are all indicated in the orientator A. The pitch, which is the rotation of the plane about its lateral axis, is indicated when the horizon indicator 20 assumes the position as shown in FIG. 12 or FIG. 13. The bank, which is the position of an airplane when its lateral axis is inclined to the horizontal, is indicated by the horizon indicator 20 when it assumes the position such as shown in FIG. 11. The degree of magnetic heading is, of course, indicated by the number of degrees on the horizon indicator 20, which appear under the guide line l. In view of the above, it can be seen that a pilot of an aircraft can always return to normal attitude by reference to the single orientator A.

In the modified embodiment 100 a simulated aircraft 101 is provided on a prismatic window 102 (see FIG. 16) and is coordinated for reading along the line of sight 104 for coordinated observation with the azimuth ring 105. As in the first embodiment, a floating element 106 having a permanent magnet 108 operatively and adjustably secured therein provides the basic datum from which the attitude and azimuth information is pictorially revealed to the pilot.

Referring now to FIG. 17, it will be seen that the permanent magnet 108 is embedded within a movable segment mounting 109 which can adjust between the positions illustratively shown in FIG. 16 in phantom lines. In this connection it will be appreciated that the magnetic lines of flux are parallel to the earth's surface at the magnetic Equator, and perpendicular to the earth's surface at the magnetic poles. In between these two points, however, the magnetic lines of flux will be at an angle to the earth's surface.

Since the movable segment 109 is designed for zero buoyancy with respect to the fluid, its adjustment is restrained only by frictional contact in the movable section compartment defined by section walls 110 (see FIG. 17). The adjustment for latitude change can be made by activating the segment ring assembly 111 in the same manner as described regarding the first embodiment, to engage the movable segment 109. The movable segment 109 seats and is held within the open aperture of the ring assembly 111, during the resetting of the floating element 106. Slots 113 are provided in the closure plate 124 to permit the movable segment 109 to swung until the magnet 108 is vertical. In operation, however, the movable segment 109 of the second embodiment permits the azimuth ring 105 to be an integral part of the floating element 106, rather than adjustable thereabouts as shown in the first embodiment. The guard ring 112 constrains the floating element 106 against dislodgement from its mount on pivot pin 114. As noted in FIG. 17, pivot pin 114 is positioned for adjustment by means of pivot pin adjustment assembly 115.

To further assist in highlighting the visual presentation, a window mask 120 is provided at the lower portion of the prismatic window 102, which as illustrated in FIGS. 15 and 16, blocks out the lower front portion of the float element 106. In addition, the spherical segment 121 provided at the rear of the housing 119 further screens off optically disturbing areas of the interior portion of the housing 119 from the view as seen by the pilot such as shown in FIGS. 15, 16, and 19.

Turning now to FIG. 17, it will be seen that the grid indicia 122 are imprinted atop the closure plate 124 for the buoyancy chamber 116. A conical dish-like configuration is presented in order that the azimuth ring 105 be readily visible by the user. The body portion 125 of the floating element 106 has an inclined symmetrical lower face 126 which provides the open portions there beneath to accommodate the sections walls 110 and movable segment 109. Further, this configuration assists in adding stability to the unit in that a portion of fluid is trapped beneath the inclined face 126 which will resist movement by the floating element 106 when rough air is encountered. Thus, the stability effect of the motor driven gyro is achieved hydraulically without a source of additional exterior power which is subject to failure at any time.

Because the angularity of the earth's lines of flux differs between the northern and southern hemisphere, provision is made by orienting the closure plate and its therebetween defined chamber for receiving the movable segment 109 in a fore and aft direction. As illustrated in FIG. 16, the phantom lines show the orientation of the permanent magnet 108 in approximately the positions it might appear in flying (subject to regular adjustment by the adjustment ring assembly 111) between the Canadian border and the Southern United States. Naturally, on the Equator, the magnet bar will be perfectly horizontal inasmuch as the magnetic lines of flux closely parallel the earth's surface of that location. When traveling into the southern hemisphere, the movable segment 109 can reverse itself and orient in the opposite position, the north and south seeking ends of the magnet remaining the same, but the parallel relationship to the earth's lines of flux for the magnetic couple being adjustable.

I claim:

1. An orienting device for use in a vehicle for indicating both the heading and the attitude of said vehicle comprising, in combination, a housing having a heading and an attitude reference, a floating member within the housing and adapted for pivotal mounting therein, a fluid within the housing coordinated with the floating member to render the latter buoyant, a transparent closure member on the housing for viewing a portion of the interior thereof, vertical pivot means extending downward from said housing into the fluid and having vertical resilience, pivot engaging means on the floating member pivotally engaged with the pivot means, said floating member being cut away to permit pivoting around the pivot means, a permanent magnet having a mounting physically mounting it within the floating member beneath the pivot point of the floating member, an azimuth ring related to said floating member in compass coordinated relationship with the permanent magnet within the floating member and the heading reference of the housing and in attitude coordinated relationship with the permanent magnet within the floating member and the attitude reference of the housing, means for adjustably coupling the azimuth ring to the permanent magnet mounting about the east-west axis thereof defined by the azimuth ring and for positionally adjusting the azimuth ring with respect to the permanent magnet mounting to compensate for deviations in the indicated attitude, whereby the azimuth ring serves the twofold purpose of providing magnetic heading and attitude references, said adjusting means comprising a seating ring oriented beneath the permanent magnet mounting, a cooperating abutment means on the vertical pivot means, the seating ring being movable for temporary engagement with the permanent magnet mounting means for temporary engagement with the permanent magnet mounting to engage the azimuth ring with the abutment means to adjust the relationship between the permanent magnet mounting and the azimuth ring.

2. An orienting device for use in a vehicle for indicating both the heading and the attitude of said vehicle comprising, in combination, a housing having a heading and an attitude reference, a floating member within the housing and adapted for pivotal mounting therein, a fluid within the housing coordinated with the floating member to render the latter buoyant, a transparent closure member on the housing for viewing a portion of the interior thereof, vertical pivot means extending downward from said housing into the fluid and having vertical resilience, pivot engaging means on the floating member pivotally engaged with the pivot means, said floating member being cut away to permit pivoting around the pivot means, a permanent magnet having a mounting physically mounting it within the floating member beneath the pivot point of the floating member, an azimuth ring related to said floating member in compass coordinated relationship with the permanent magnet within the floating member and the heading reference of the housing and in attitude coordinated relationship with the permanent magnet within the floating member and the attitude reference of the housing, adjustable magnet mounting means for positionally adjusting the permanent magnet with respect to the azimuth ring to compensate for deviations in the indicated attitude, whereby the azimuth ring serves the twofold purpose of providing magnetic heading and attitude references, said adjustable magnet mounting means comprising a movable segment in which the permanent magnet is mounted, the movable segment being pivotally engaged with and adjustable in the vertical plane of the north-south axis of the floating member defined by the azimuth ring and about the pivot engaging means on the floating member to permit the permanent magnet to pivotally adjust itself to any position from a horizontal position to a vertical position, a segment chamber within said floating member in which the movable segment is constrained to pivotally move in the defined vertical plane, and means for moving said movable segment.

3. An orienting device as in claim 2, wherein the azimuth ring is oriented on the periphery of the floating member and comprises the top portion thereof.

4. An orienting device as in claim 3, having a grid superimposed upon the upper portion of the floating member circumscribed by the azimuth ring, the azimuth ring having indicia thereon defining 360°, and the grid being oriented with straight lines parallel to the north-south orientation and east-west orientation of the azimuth ring indicia, respectively.

5. An orienting device as in claim 3, further including a transparent prismatic window in the housing having a miniature aircraft symbol superimposed thereon, the window being disposed and proportioned and the aircraft symbol being positioned thereon so that a viewer upon looking at the aircraft symbol will observe its direct relationship with the azimuth ring.

References Cited

UNITED STATES PATENTS

| 1,216,953 | 2/1917 | Greagh-Osborne et al. | 33—223 |
|---|---|---|---|
| 1,306,882 | 6/1919 | Clarke. | |
| 1,474,394 | 11/1923 | Warburg | 33—72 |
| 1,701,034 | 2/1929 | Escallier | 33—222 |
| 1,966,845 | 7/1934 | Carbonara. | |
| 2,043,168 | 6/1936 | Havill | 33—204 |
| 2,192,148 | 2/1940 | Otto | 33—223 |
| 2,215,622 | 9/1940 | Sperry | 33—223 |
| 2,220,457 | 11/1940 | Moss | 33—204 |
| 2,300,710 | 11/1942 | Sperry | 33—223 |
| 2,761,056 | 8/1956 | Lazo. | |
| 2,909,845 | 10/1959 | Mikesell | 33—222 |

FOREIGN PATENTS

| 420,699 | 12/1910 | France. |
|---|---|---|
| 3,644 | 1/1813 | Great Britain. |
| 9,926 | 7/1888 | Great Britain. |
| 287,536 | 10/1928 | Great Britain. |

ROBERT B. HULL, *Primary Examiner.*